(No Model.) 5 Sheets—Sheet 2.

J. H. ABRAHAM & E. K. MARTIN.
CIGAR BUNCHING MACHINE.

No. 394,901. Patented Dec. 18, 1888.

Witnesses.
Dan H. Herr.
Geo. A. Lane

Inventor,
John H. Abraham.
E. K. Martin.
By their Attorney
Wm. A. Gerhart

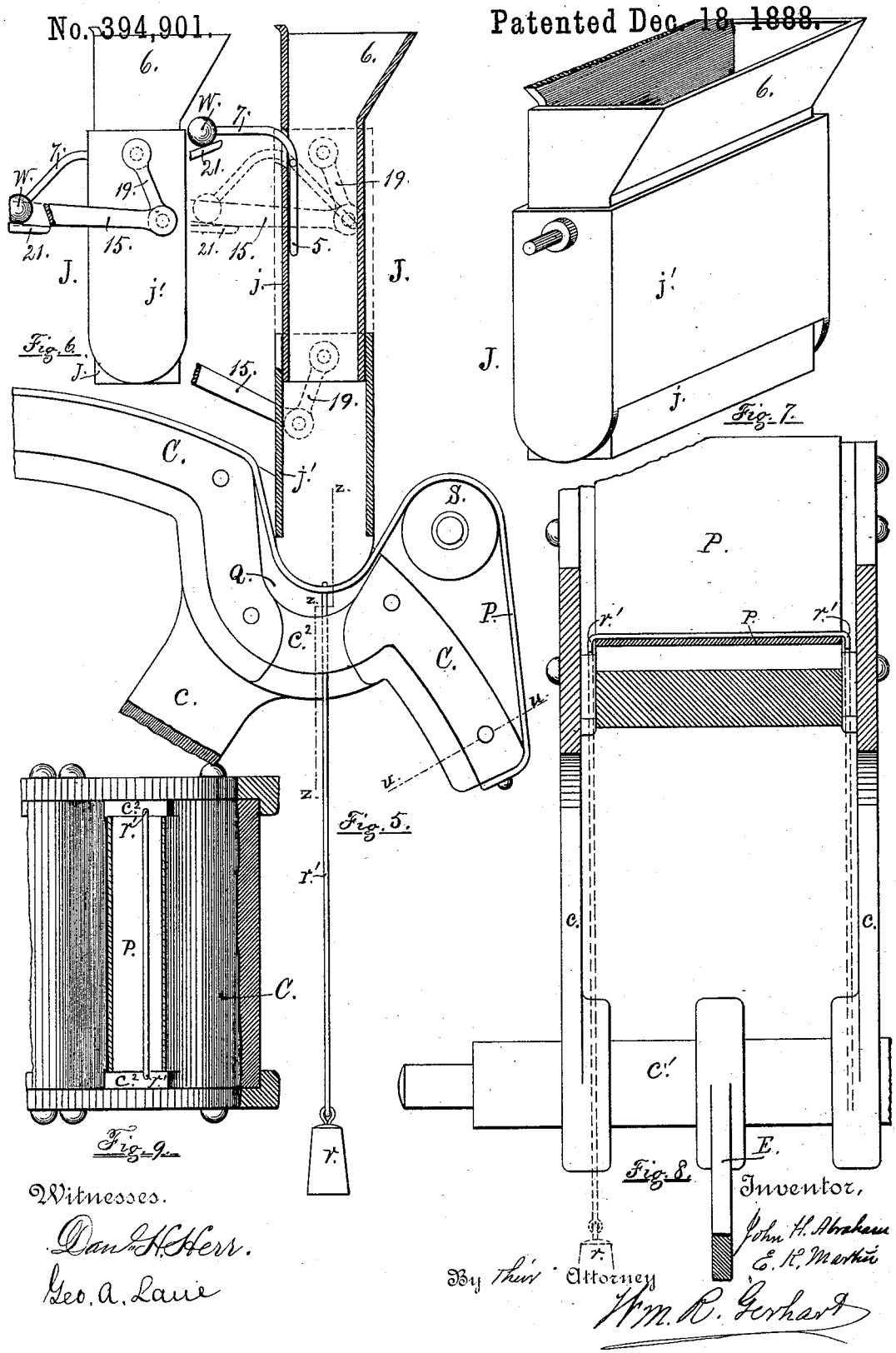

(No Model.) 5 Sheets—Sheet 4.
J. H. ABRAHAM & E. K. MARTIN.
CIGAR BUNCHING MACHINE.
No. 394,901. Patented Dec. 18, 1888.
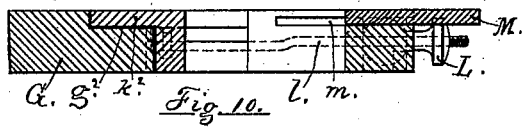
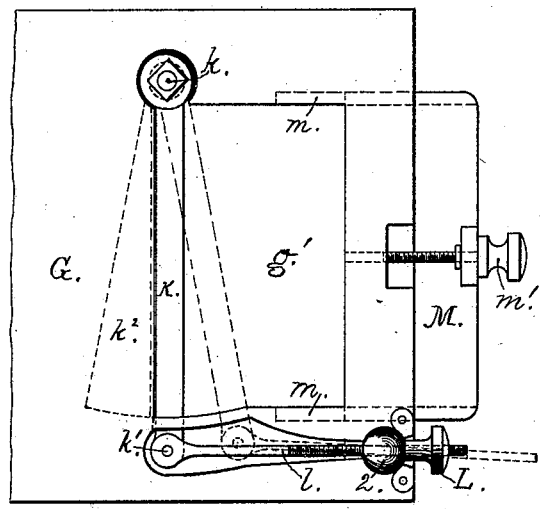
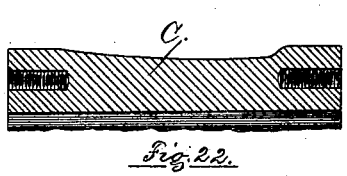
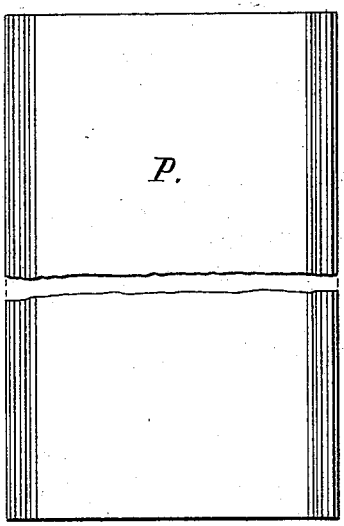
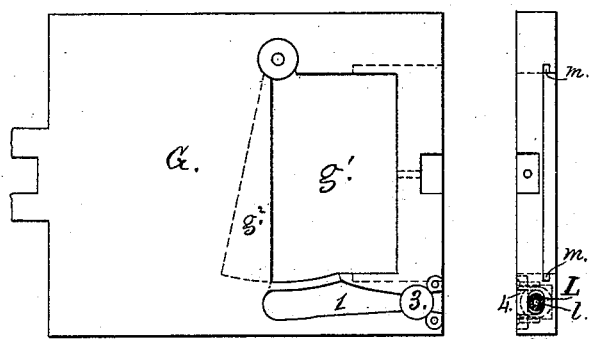
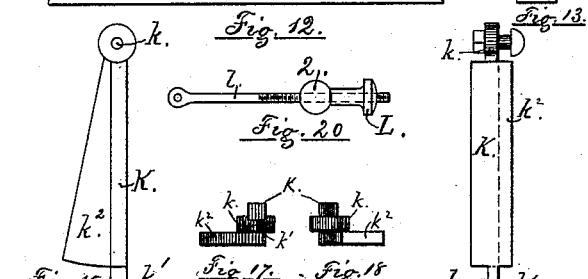
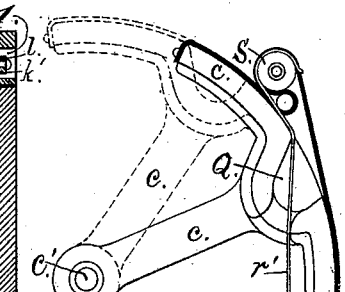
Witnesses.
Dan¹. H. Herr.
Geo. A. Lane
Inventor,
John H. Abraham,
E. K. Martin,
By their Attorney
Wm. R. Gerhart (No Model.) 5 Sheets—Sheet 5.
J. H. ABRAHAM & E. K. MARTIN.
CIGAR BUNCHING MACHINE.
No. 394,901. Patented Dec. 18, 1888.
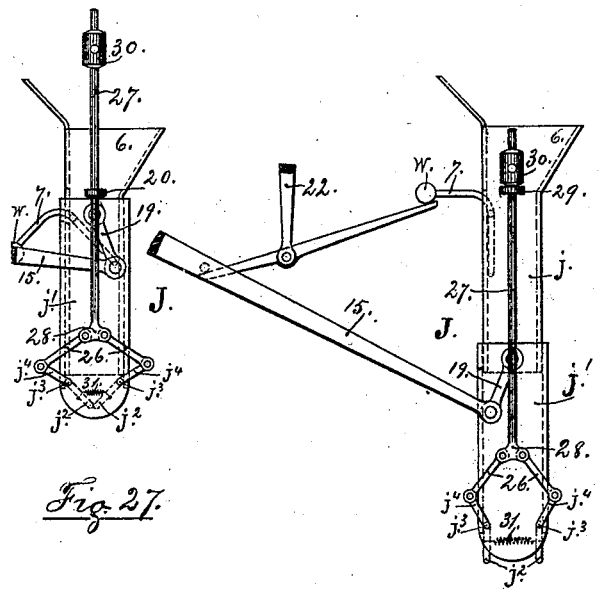
Fig. 27.
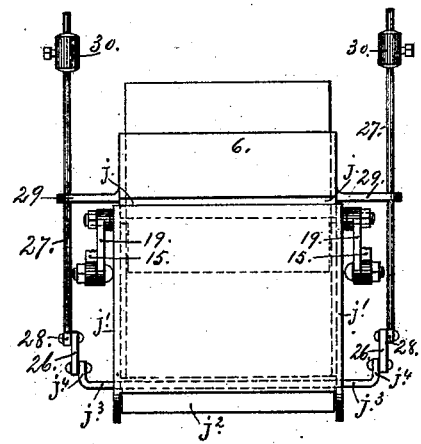
Fig. 26.
Fig. 28.
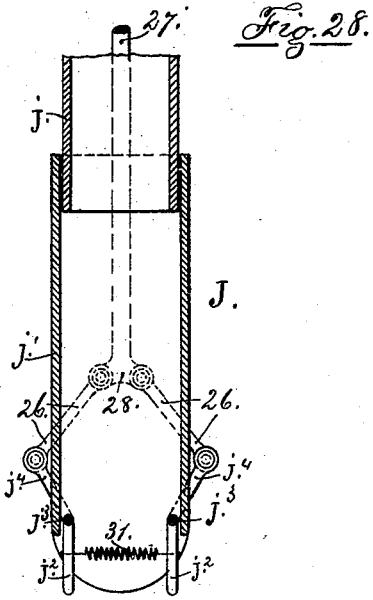
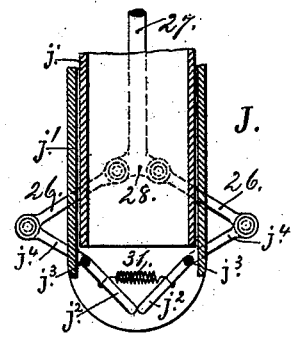
Fig. 30.
Fig. 29.
Witnesses.
Dan'l H. Herr.
Geo. A. Lane.
Inventor,
John H. Abraham.
E. K. Martin
By their Attorney
Wm. R. Gerhart

UNITED STATES PATENT OFFICE.

JOHN H. ABRAHAM AND EDWIN K. MARTIN, OF LANCASTER, PENNSYLVANIA.

CIGAR-BUNCHING MACHINE.

SPECIFICATION forming part of Letters Patent No. 394,901, dated December 18, 1888.

Application filed February 23, 1888. Serial No. 264,926. (No model.)

*To all whom it may concern:*

Be it known that we, JOHN H. ABRAHAM and EDWIN K. MARTIN, citizens of the United States, residing at Lancaster, in the county of Lancaster and State of Pennsylvania, have invented certain new and useful Improvements in Cigar-Bunching Machines, of which the following is a specification.

Our invention relates to an improvement in that class of cigar-bunching machines in which the filler is automatically deposited in the pocket and rolled in the binder; and these improvements consist in, first, the combination, with the plunger and hopper having an opening in its bottom, of the lever, the cross-piece secured to the end thereof above the mouth of the hopper, tines secured in the end of the lever and the cross-piece and extending down into the hopper, and the link connecting the plunger and lever; second, the combination, with the horizontal plunger having an opening through the same to receive the tobacco from the hopper, of its actuating devices, the bed-plate, a hopper having the discharge-opening registering with the opening in the plunger, a shaping-bar pivoted at one end to the plunger and locked in the opening in the same, and a mechanism for adjusting the other end of the said shaping-bar; third, the combination, with the plunger having an opening through it to receive the tobacco, of its operating mechanism, the bed-plate, a hopper having a discharge-opening therein, a shaping-bar pivoted at one end to the plunger and located in the opening of the same, and a device for adjusting the other end of the shaping-bar; fourth, the arrangement and combination of parts, which will be more fully described hereinafter.

Our invention is illustrated in the accompanying drawings, in which—

Figure 1:
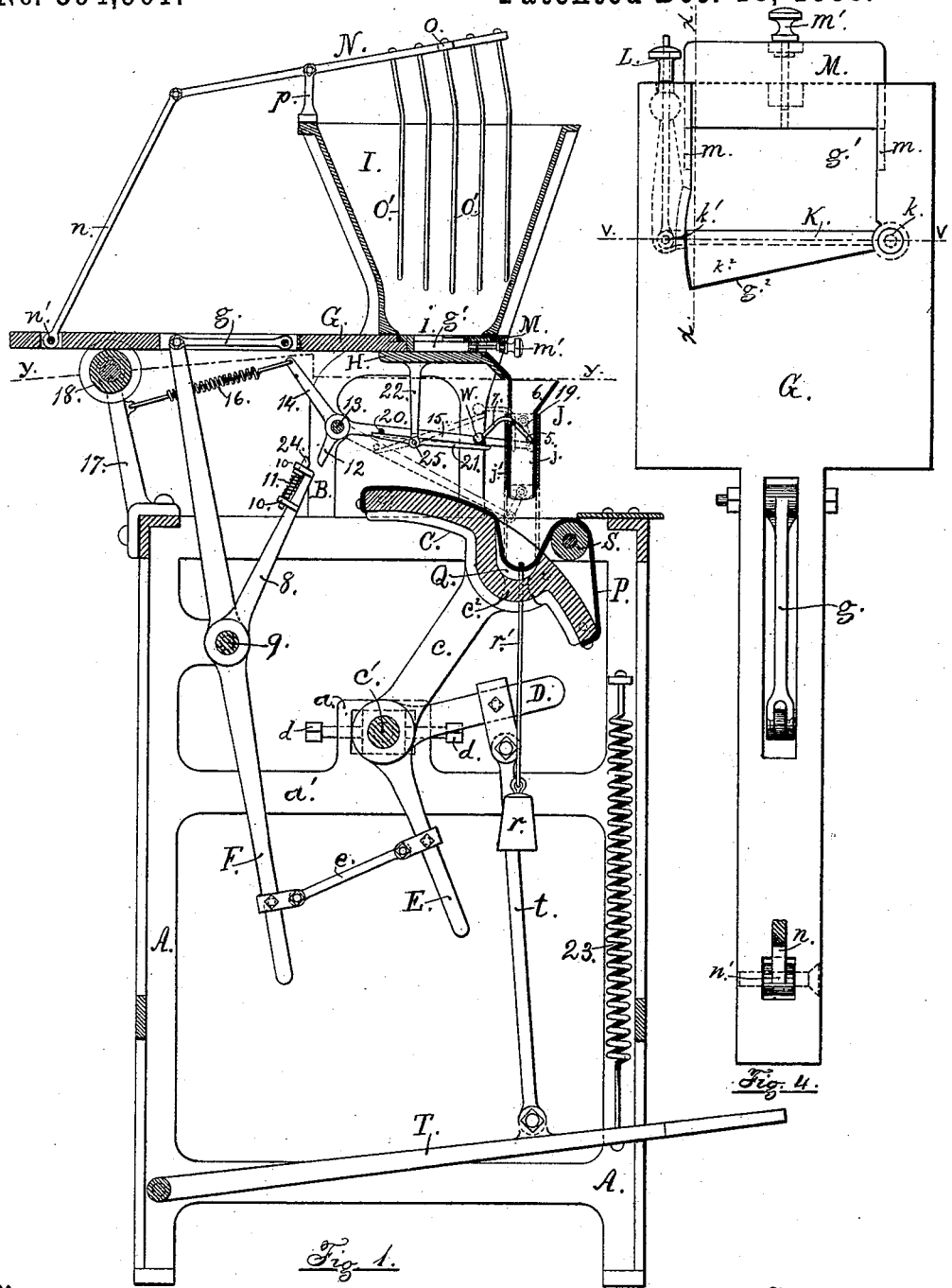
Figure 2:
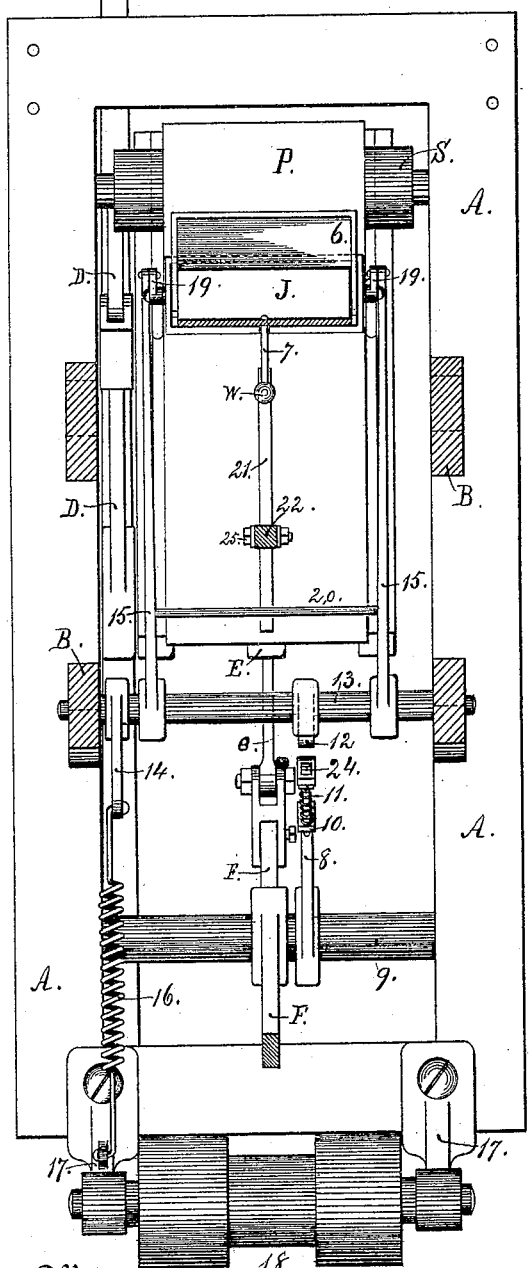
Figure 3:
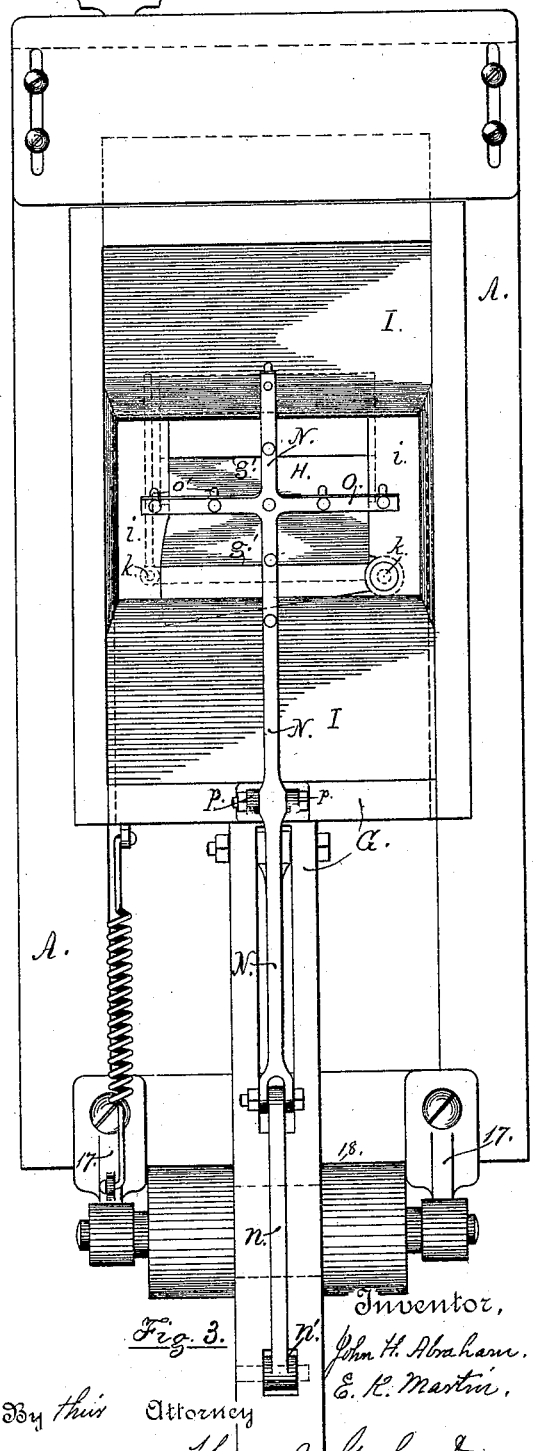

Figure 1 is a vertical longitudinal section of the entire machine. Fig. 2 is a top view, all parts above the line $y\ y$ and the adjustable guide-plate over the roller being removed. Fig. 3 is a full top or plan view of the whole machine. Fig. 4 is a top view of the plunger-plate. Fig. 5 is an enlarged side view of the reciprocating table and the telescopic chute, the latter in section. Fig. 6 is an end view of said chute closed. Fig. 7 is a perspective view of the same. Fig. 8 is a vertical transverse view through the line $z\ z$ of Fig. 5. Fig. 9 is a top view of the pocket in the table. Fig. 10 is an enlarged vertical section through the line $x\ x$ of Fig. 4; Fig. 11, an enlarged bottom view of the front end of the plunger. Fig. 12 shows the bottom of the plunger-plate, the operating mechanism connected therewith being removed. Fig. 13 is a front elevation of Fig. 12, the stem of the ball-screw appearing in place. Fig. 14 is a section through the line $v\ v$ of Fig. 4. Fig. 15 shows the bottom of the shaper; Fig. 16, the front face of the same, with the bottom turned upward. Figs. 17 and 18 are views of opposite ends of said shaper. Fig. 19 shows a top and front view of the plates which support the ball-screw handle. Fig. 20 illustrates the adjusting-rod and ball-screw of shaper; Fig. 21, a section through the line $u\ u$ of Fig. 5; Fig. 22, a section of the table-sheeting having molding-surfaces. Figs. 23 and 24 show the bunching-apron with elastic sides; Fig. 25, the table in a progressive position. Fig. 26 is a front elevation of our telescopic chute having double trap-doors at the bottom of the lower portion; Fig. 27, an end view with the doors closed; Fig. 28, a view of the same with them open. Fig. 29 represents a side elevation of the telescopic chute with the trap-doors open, the upper portion of the chute being in section and the lower having the side removed; and Fig. 30 is a view of the same with the trap-doors closed.

In the accompanying drawings, A represents any suitable supporting stand or table, to the bed of which a pair of upright standards are secured. A reciprocating table, C, situated beneath the chute, to be hereinafter described, is supported by downwardly-projecting arms $c$, secured to the cross-rod $c'$, journaled in the box $a$ of the cross-piece $a'$ of the frame. This rod $c'$ is adjustable horizontally by the adjusting-screws $d$. The rod $c'$ is oscillated by the arm D, connected with the treadle T by the jointed link $t$. The arm E, rigidly fastened to the rod $c'$, imparts motion to the lever F by means of the link $e$. This lever actuates all of the mechanism of the bunching-machine above the table C. The upper end of the lever F is connected with the plunger G by the link $g$ and imparts to it a reciprocating motion, the forward movement driving the tobacco which falls upon the bed-plate H through the opening $i$ in the bottom of the hopper I and the opening $g'$ in the said plunger forward into the chute J.

The size of the entrance into the opening $g'$ in the plunger which receives the tobacco from the hopper is regulated by a sliding plate, M, located in the front end of the plunger. This plate is moved back and forth in the slots $m$ in the side walls of the same by the set-screw $m'$. The width of that entrance is also varied crosswise of the plunger to regulate the quantity of tobacco received in that space in proportion as it is to be distributed to the ends and the middle of the cigar. This is accomplished by pivoting one end, $k$, of a shaping-bar, K, in one side of the rear end of the opening $g'$. The bar sets in the opening $g'$, and is of the same thickness as the plunger, so that as said plunger moves forward the tobacco is carried along by the bar. The end $k'$ of the bar is moved back and forth to vary the width of the opening $g'$ by a ball-screw, $l$, operated by the hand-nut L. To cover the triangular opening formed between the back of the shaping-bar and the end of the opening $g'$, there is a covering plate or curtain, $k^2$, attached to the bar at its upper rear edge, which extends backward and is of sufficient depth to cover any practicable enlargement of the said triangular opening. This curtain rests in a recess, $g^2$, in the top of the plunger and swings back and forth with the bar K. The upper surface of the bar and covering-plate is in the same plane with the top of the plunger.

By the adjustment of the plate M the amount of tobacco received by the opening $g'$ is regulated, while by the adjustment of the movable end $k$ of the shaping-bar K the quantity of filler to be rolled in the ends of the cigar is varied. By moving the end $k$ of the bar K out into the opening $g'$ there will be more tobacco discharged into the chute J from one side of said opening than the other, and this difference in the amount so fed into the chute may be regulated in proportion to the difference to be made in the thickness of the ends of the cigars. (See Figs. 4, 10, 11, 12, and 15.) It is difficult to distribute the filling material to vary the thickness of the different parts of the cigar after it has been deposited in the pocket, and the use of our shaping-bar prevents any necessity for so doing.

The ball-screw $l$, operating the shaper, is located in a recess, 1, in the bottom of one side of the plunger, the ball 2 being received by the circular countersink 3 in one end of the recess and supported in place by the plate 4. The recess is of such shape as to permit the necessary movement of the stem of the screw in its action upon the shaper, as shown in Fig. 12. The back end of the plunger is connected with a lever, N, fulcrumed at the rear edge of the hopper I, on the standard $p$, by a link, $n$, pivoted at $n'$ in said plunger. The end of the lever N extending over the hopper is provided with a cross-bar, O, and both that end and the cross-bar have tines $o'$ secured therein and projecting downward into the hopper, forming a pronged plunger or the vertical stirrer, which drives the tobacco downward through the opening in the bottom of the hopper onto the bed-plate H.

There is an obvious advantage in this pronged plunger, in that it drives all the bits of tobacco, both large and small, down through the opening in the bottom of the hopper together, that it cannot become clogged, and in that it acts directly toward the point through which the contents of the hopper are to be driven.

The tobacco received on the bed-plate is carried forward by the movement of the plunger G and discharged into the chute J. This chute is of peculiar construction, consisting of two portions, the upper, $j$, being rigidly secured to the hopper, and the other, $j'$, moved vertically, like a sleeve, about the lower portion of the first. The upper part, $j$, is provided with a trap, 5, hinged therein to one side beneath the hopper 6 thereof, and has a rearwardly-extending-arm, 7, through the back of the chute, which carries the weight W at its outer end. The trap normally extends across the chute, as shown in Fig. 1, slips downward from the hinged side to the other, and is supported in that position by the weight. When the tobacco is discharged into the hopper 6, it is received on said trap, the lower portion of the chute drops into the pocket formed in the apron below it, and the trap falls, as shown in Fig. 5, allowing the tobacco to drop into the pocket through a continuous chute, which prevents it from spreading and carries it into the pocket substantially in the proportion in the length of the filler as made by the shaper. The trap is then closed and the lower portion of the chute raised. In order to use a continuous chute it is necessary for the lower part to be movable vertically in order to permit the reciprocating table G to operate.

The lower portion, $j'$, of the chute is provided with double trap-doors $j^2 j^2$, one hinged on each side of the chute at the point where the bottom end curve of the same begins. The stem $j^3$ of each hinge projects through the ends of the chute, and each has a short lever-arm, $j^4$, rigidly attached thereto and extending outward at each end. The two levers are pivotally connected by means of links 26 with the actuated rod 27 at a point, 28, some distance above and centrally between the hinges. The rod 27, passing upward through an opening in the lug 29, is secured to the end of the upper section, $j$, and carries a weighted stop, 30, at the upper end thereof. The gates are closed upon each other by the downward pressure of the stop 30 when the lower section rises; but in case this should be insufficient the ends of the gates may be connected by springs or other retracting devices, 31.

When this device is used, the upper trap is constructed to open and discharge its contents into the double trap before the part $j'$ begins to descend, the mechanisms already described being made to drop the part $j'$ after it has received the charge. This part $j'$ drops until it reaches the pocket, and just before that movement the weighted stop 30 engages the lug 29, and, exerting an upward tension upon the rod 27, opens the traps $j^2 j^2$ and deposits the tobacco carried by the same upon the bunching-apron. This construction prevents the long fall to which the tobacco would be otherwise subjected scattering the same to a great extent, if not wholly neutralizing the action of the shaper K. It keeps the tobacco practically distributed throughout the length of the cigar as delivered from the plunger. If there were no other means of forming a pocket in the bunching-apron P, this movement of the lower portion of the chute performs that service.

The reciprocating table located beneath the chute has a recess, Q, formed in the sheathing thereof, which, when the table is in a position to receive a charge, lies directly beneath the chute. In that position the slack of the bunching-apron P is drawn downward therein to form a pocket by weights $r$, attached to cords $r'$, fastened to its sides, and which pass through slots $c^2$ in the bottom of the recess Q. (Shown in Fig. 5.) Immediately in front of the recess there is a roller, S, journaled in the frame A, over which the apron fastened to both ends of the table passes and between which and the table the cigar is rolled, as shown in Fig. 25.

The various devices herein described are operated by the mechanism fully illustrated in their relative positions in Fig. 1, and the means by which the reciprocating table and plunger are actuated have already been described. To produce the various movements of the lower portion of the chute, an arm, 8, projects diagonally upward from the cross-rod 9, to which the lever F is pivoted, and is reciprocated back and forth in the same manner as the lever.

The end of the arm 8 has a yielding point consisting of a bolt, 24, working through lugs 10 on the side of the arm. Inside of the forward lug the bolt is provided with a collar which serves as a bearing for a spring coiled about it, the other end of which bears upon the inner lug. The outer end of the bolt is beveled and engages an arm, 12, projecting downward from the vibrating rod 13 with a yielding pressure. There are two other arms, 14 and 15, secured to the rod 13. The arm 14 projects rearwardly toward the plunger, and is connected by means of a spring, 16, to one of the standards 17, which support the roller 18, upon which the rear end of the plunger rests. Arms 15 extend forward and are connected by means of links 19 with the lower portion, $j'$, of the chute. These arms 15, by means of the pin 20, which one of them carries, also actuate a lever, 21, fulcrumed at 25 to the hanger 22, secured to the bottom of the bed-plate H. The lever extends forward and engages the weight W, so as to open the trap 5 after the lower portion of the chute has dropped into the pocket.

As will be observed, the devices when in their normal positions, as shown in full lines of Fig. 1, are held so by the spring 23, connecting the frame A and the treadle T. The plunger being in position to deliver a charge, the lower part of the chute being raised, the trap is closed and the pronged plunger is depressed. The depression of the treadle throws the plunger G forward. As the charge is delivered into the chute the treadle is released, the lower portion of the chute drops into the pocket, and the trap falls, delivering the charge into the pocket. The movements of the trap and lower chutes are almost simultaneous, although the latter reaches the pocket first. The movements of the reciprocating table coincide with those of the other parts of the mechanism, so as to receive the charge in the pocket when delivered from the chute, as is usual.

Our bunching-apron is peculiarly arranged, the body thereof being non-elastic and the edges or sides elastic. The object is to enable the apron to adjust itself to the forming-table. (Shown in Fig. 22.) The edges contract to permit the body of the apron to conform to the shape of the table. Of course the same device is applicable to any roller over which the apron might pass.

No claim is made in this specification to any of the devices shown in the application filed by John H. Abraham, July 13, 1887, Serial No. 244,211, for an improvement in cigar-bunching machines.

Having thus described our invention, we claim—

1. The combination, with the plunger G and hopper I, having an opening in the bottom, of the lever N, a cross-piece, O, secured to the end thereof above the mouth of the hopper, tines O', secured in the said end of the lever N and the cross-piece and extending down into the hopper, and the link $n$, connecting the plunger and lever, all combined and operating substantially as specified.

2. In a cigar-bunching machine, the combination, with the horizontal plunger having an opening through the same to receive the tobacco from the hopper, of its actuating devices, the bed-plate, a hopper having a discharge-opening therein registering with the opening in the plunger, a shaping-bar pivoted at one end to the plunger and located in the opening in the same, and a mechanism for adjusting the other end of the said shaping-bar, substantially as and for the purpose specified.

3. In a cigar-bunching machine, the combination, with the reciprocating plunger having an opening through the same to receive the tobacco from the hopper, its operating mechanism, the bed-plate, a hopper having a discharge-opening therein, a shaping-bar pivoted at one end to the plunger and located in the opening of the same, and a device for adjusting the other end of the shaping-bar, for the purpose specified.

4. In a cigar-bunching machine, the combination, with the hopper and receiving-table, of a chute composed of an upper stationary hollow portion and a lower vertically-movable hollow portion, one part being pushed into the other when they are not in use, a trap pivoted in the upper portion, and a mechanism to drop the lower portion to form a continuous passage from the hopper to the table and open the trap, and then close the trap and raise the lower portion to its original position, substantially as and for the purpose specified.

5. In a cigar-bunching machine, the combination, with the hopper and receiving-table, of a chute divided into two hollow portions, which, when not in use, are closed together, the one within the other, the upper portion being stationary and the lower movable vertically, a trap located in the movable portion, and mechanism to lower the movable portion to form a continuous passage from the hopper to the table and afterward open the trap, and then close the trap and raise said movable portion to its original position, substantially as and for the purpose specified.

JOHN H. ABRAHAM.
E. K. MARTIN.

Witnesses:
JOHN W. APPEL,
WM. R. GERHART.